United States Patent [19]
Moyer

[11] 4,168,927
[45] Sep. 25, 1979

[54] MACHINE TOOL CARRIAGE GUIDEWAY UNIT

[75] Inventor: Maynard M. Moyer, Rochester, Mich.

[73] Assignee: Snyder Corporation, Detroit, Mich.

[21] Appl. No.: 808,298

[22] Filed: Jun. 20, 1977

[51] Int. Cl.² .................. B23B 21/00; B23B 47/22
[52] U.S. Cl. ................... 408/130; 408/199; 308/3 A
[58] Field of Search .................. 408/62–64, 408/234, 238, 138, 130, 102, 99, 199, 9, 14; 82/24 R, 21 A; 308/3 A, 6 R

[56] References Cited

U.S. PATENT DOCUMENTS

| | | | |
|---|---|---|---|
| 2,369,546 | 2/1945 | Dwyer | 82/24 R |
| 2,415,158 | 2/1947 | Bowen | 308/3 A |
| 3,220,782 | 11/1965 | McCabe | 308/3 A |
| 3,439,581 | 4/1969 | Wilkins | 408/130 |
| 3,859,003 | 1/1975 | Schulz et al. | 308/3 A |

FOREIGN PATENT DOCUMENTS 2224202  11/1973  Fed. Rep. of Germany .......... 408/130

*Primary Examiner*—Leonidas Vlachos
*Attorney, Agent, or Firm*—Barnes, Kisselle, Raisch & Choate

[57] ABSTRACT

A carriage and guideway unit for a machine tool having a carriage carried by a pair of laterally spaced apart ways with a central portion of the carriage extending between and longitudinally of and bearing on the ways to align the carriage for longitudinal sliding movement along the ways. The carriage is reciprocated on the ways by a drive means having an actuator rod extending between the ways and connected to the carriage such that the centerline of action and reaction between the drive rod and the carriage is centered between and extends longitudinally of the ways and is in the plane of the faces of the ways carrying the carriage.

8 Claims, 5 Drawing Figures

MACHINE TOOL CARRIAGE GUIDEWAY UNIT

This invention relates to machine tools and more particularly to an improved carriage guideway unit.

Objects, features and advantages of this invention are a carriage and guideway unit providing improved accuracy in alignment of the carriage and guidance of the carriage during movement thereof, a more compact arrangement with a lower height or vertical profile, a simplified design having fewer component parts, and more economical construction and assembly.

These and other objects, features and advantages of this invention will be apparent from the following detailed description, appended claims, and accompanying drawings in which:

Figure 1:
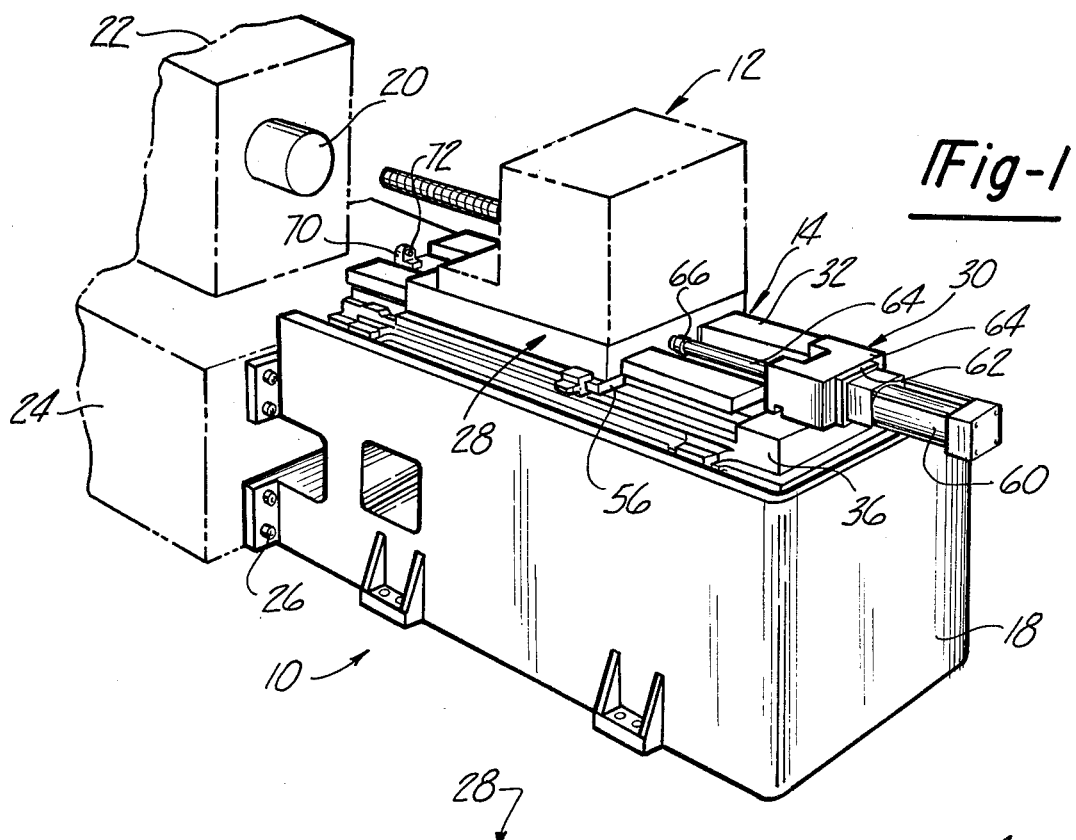
FIG. 1 is a pictorial illustration of a boring machine having a carriage and guideway unit embodying this invention.

Referring in more detail to the drawings, FIG. 1 illustrates a boring machine 10 having a boring head 12 mounted on a carriage and guideway unit 14 embodying this invention which is secured by cap screws 16 (FIGS. 2 and 4) to a main machine base 18. A workpiece 20 is received in a workpiece holder 22 carried by an auxiliary base 24 secured by cap screws 26 to the main base 18.

As shown in FIGS. 1-4, unit 14 has a carriage 28 which is reciprocated by a hydraulic actuator 30 on a pair of ways 32 aligned by keys 34 and secured to a slide base 36. Carriage 28 has a pair of grooves therethrough each receiving a way 32 and forming a center section or post 38 extending between and longitudinally of the ways. Ways 32 each have flat guide surfaces 40 which bear on complimentary longitudinally extending surfaces 42 in carrier 28 and at a right angle thereto longitudinally extending flat guide surfaces 44 on the inner edges of the ways. Guide surfaces 44 are laterally spaced apart from, parallel with, and generally opposed to each other and bear on complimentary flat surfaces 46 and 48 on the center post 38 of carrier 28. To provide wear take up and permit adjustment of the sliding fit of post 38 between ways 32 guide surface 48 is on one face of each of a pair of gibs 50 (FIGS. 4 and 5) adjustably secured to the center post.

Figure 4:
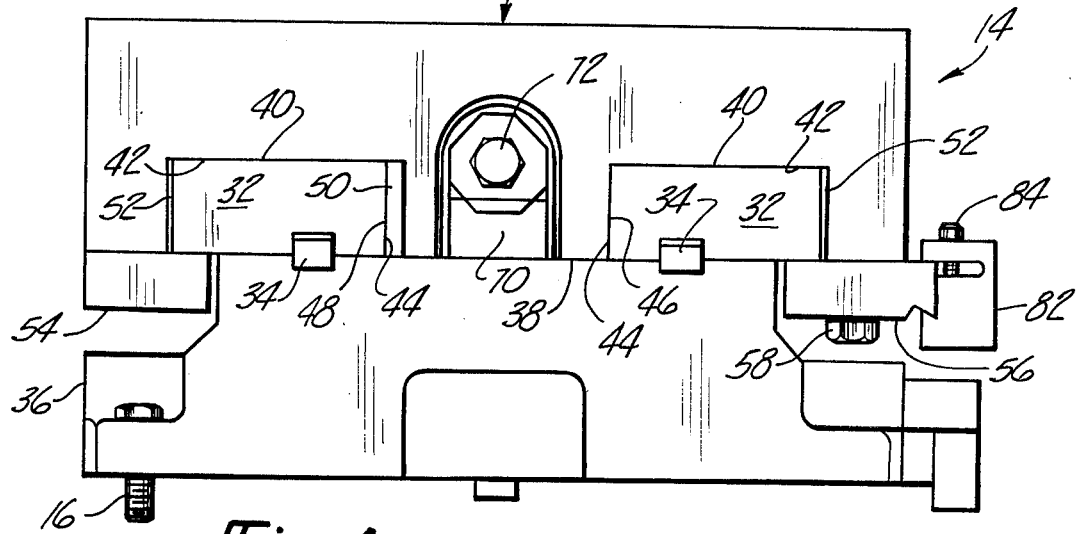
FIG. 4 is an end view of the carriage and guideway unit of FIG. 1.
Figure 2:
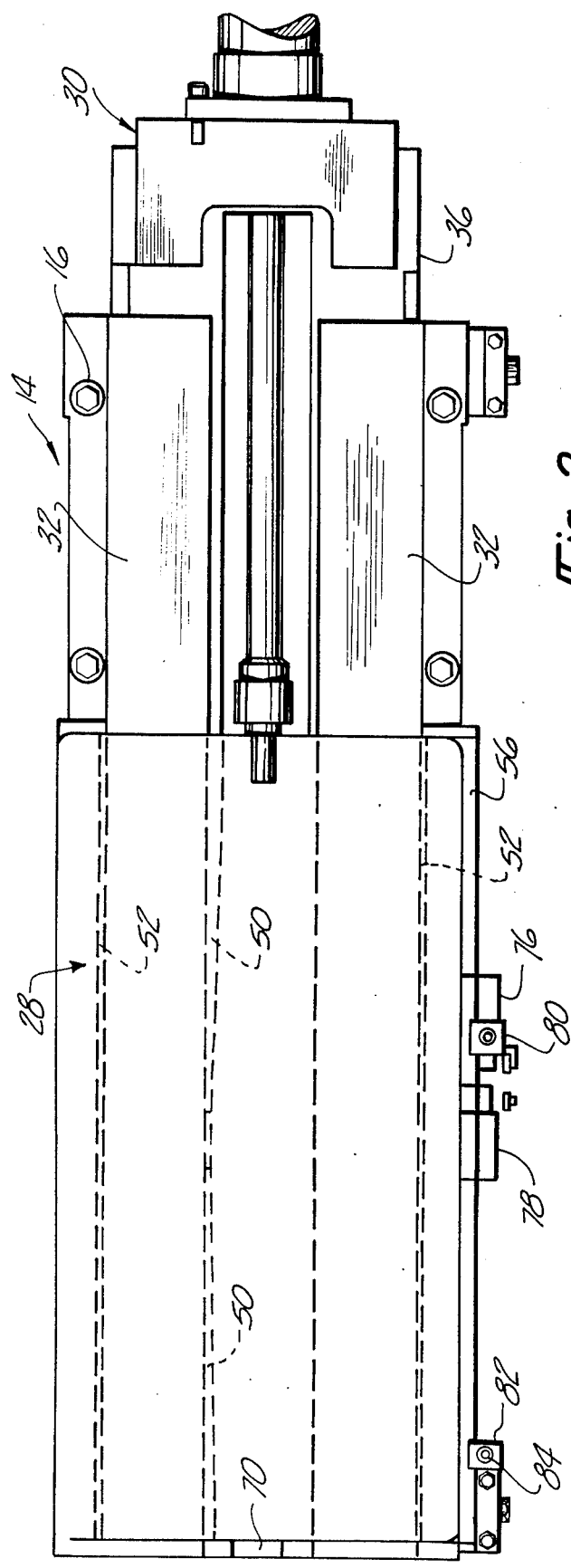
FIG. 2 is a fragmentary plan view of the carriage and guideway unit of FIG. 1.
Figure 3:
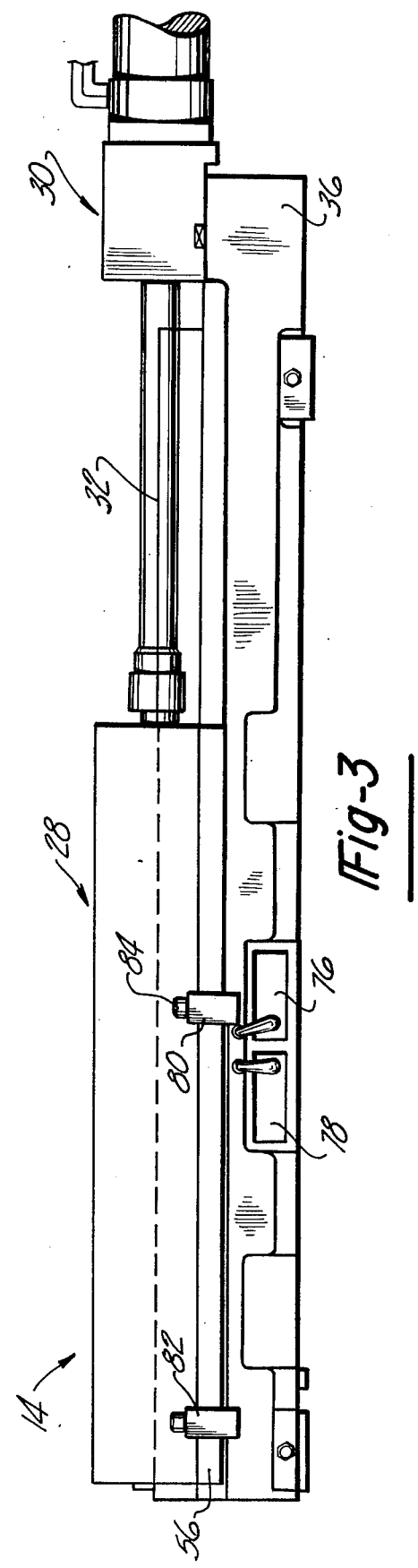
FIG. 3 is a fragmentary side view of the carriage and guideway unit of FIG. 1.

As shown in FIGS. 2 and 4 there is a slight clearance 52 between the carriage and the outer edge face of ways 32, and the carriage is retained on the ways by a pair of keepers 54 and 56 secured to the carriage by cap screws 58. In accordance with one feature of this invention and as shown in FIG. 4, unit 10 has a low profile in which the thickness of the unit from the bottom of slide base 36 to the top or mounting surface of carriage 28 is not greater than about six times the thickness of a way 32 and the distance from the bottom of a way 32 to the top or mounting surface of carriage 28 is not greater than about three times the thickness of a way 32.

Figure 5:
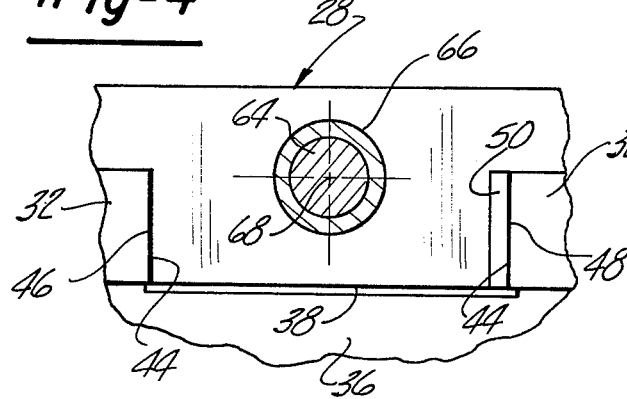
FIG. 5 is an enlarged fragmentary view partially in section of the encircled portion in FIG. 1 of the carriage and guideway unit.

Carriage 28 is reciprocated by actuator assembly 30 which has a hydraulic cylinder 60 carried by a plate 62 secured to a mounting block 64 fastened to slide base 36. An actuator rod 64 of hydraulic cylinder 60 extends between ways 32 and is connected to one end of carriage 28 by a coupling 66. In accordance with another feature of this invention, the centerline of action through which thrust is applied by actuator 30 through actuator rod 64 to carriage 28, as shown in FIG. 5 and indicated at 68, lies in the plane of the guide surfaces 40 of ways 42 and is centered between and extends generally longitudinally of the ways 32. By so locating the line of action and reaction between actuator rod 64 with carrier 28 and by having center post 38 of the carrier extend between and bear on ways 32 the accuracy with which carrier 38 is guided when it is reciprocated on ways 32 is materially improved.

As shown in FIGS. 1 and 4 a positive stop 70 is secured to base 36 and has a stop button 72 which in accordance with another feature of this invention and as shown on FIG. 4 is coincident with or centered on the line of action 68 through which the thrust of actuator rod 64 is transmitted to carriage 28. In normal operation of unit 10 the reciprocation of slide 28 by actuator unit 30 is controlled by forward and reverse limit switches 76 and 78, the actuating arms of which are tripped by dogs 80 and 82 slideably received on way 56 and releasably secured thereto by cap screws 84.

The construction and arrangement of the carriage and ways and the location of the actuator rod between the ways provides a particularly compact unit having a relatively short vertical height or low profile as well as a design having a minimum number of component parts which can be easily and economically constructed and assembled to produce a unit having improved accuracy when used in machining operations.

I claim:

1. A machine tool carriage and guideway unit consists essentially of a base, first and second longitudinally extending and laterally spaced apart ways carried by said base and each having a first flat guide surface and a second flat guide surface adjacent and at generally a right angle to said first flat guide surface, at least one of said ways being separate from and secured to said base, said first guide surfaces lying in substantially the same plane and said second guide surfaces being in generally opposed laterally spaced apart parallel relationship to each other and lying between said first guide surfaces, a carriage carried by said ways for generally longitudinal movement along said ways and having a pair of longitudinally extending and laterally spaced apart third guide surfaces lying in substantially the same plane and each bearing on one of the first flat guide surfaces of one of said ways and a center portion extending generally longitudinally between said first and second ways and having a pair of laterally spaced apart and longitudinally extending fourth flat guide surfaces received between said ways and each bearing on one of said second guide surfaces of one of said ways, and an actuator for reciprocating said carriage with respect to said base having a drive member constructed, arranged, and connected to said carriage such that the line of thrust applied to said carriage by said drive member lies essentially in the plane of said first guide surfaces of said ways and extends parallel to and is essentially centered between said second guide surfaces of said ways, whereby said saddle is accurately aligned and carried by said ways for generally longitudinal sliding movement along said ways with respect to said base.

2. The unit of claim 1 wherein one of the pair of said fourth guide surfaces of said carrier comprises a flat face of at least one gib carried by said carrier.

3. The unit of claim 1 which also comprises a positive stop for said carriage which is carried by said base and has its centerline coincident with the line of thrust of the drive member of said actuator.

4. The unit of claim 1 wherein each of said ways is keyed to said base by keys extending generally longitudinally of said ways and received between said ways and said base in longitudinally extending grooves.

5. The unit of claim 1 wherein the thickness of the unit from the bottom of said ways to the mounting surface of said carriage is not greater than three times the thickness of one of said ways.

6. The unit of claim 1 wherein the thickness of the unit from the bottom surface of the base to the mounting surface of said carriage is not greater than six times the thickness of one of said ways.

7. The unit of claim 6 wherein the thickness of the unit from the bottom of said ways to the mounting surface of said carriage is not greater than three times the thickness of one of said ways.

8. The unit of claim 1 wherein said line of thrust of said drive member lies in the plane of said first guide surfaces of said pair of ways and is centered between said second pair of guide surfaces of said ways.

* * * * *